United States Patent

[11] 3,624,474

| | | | |
|---|---|---|---|
| [72] | Inventor | Jean Marie Nolf<br>Forst, Belgium | |
| [21] | Appl. No. | 715,383 | |
| [22] | Filed | Mar. 22, 1968 | |
| [45] | Patented | Nov. 30, 1971 | |
| [73] | Assignee | U.S. Philips Corporation<br>New York, N.Y. | |
| [32] | Priority | Mar. 24, 1967 | |
| [33] | | Belgium | |
| [31] | | 41,578 | |

[54] SERIES MOTOR ON-OFF SPEED CONTROL CIRCUIT HAVING MEANS FOR GENERATING A COMPLEMENTARY FIELD CURRENT
13 Claims, 4 Drawing Figs.

[52] U.S. Cl............................................... 318/331, 318/341
[51] Int. Cl............................................. H02p 5/16
[50] Field of Search........................................ 318/331, 332, 345, 341

[56] References Cited
UNITED STATES PATENTS

| 3,027,505 | 3/1962 | Auld, Jr........................ | 318/331 |
| 3,283,235 | 11/1966 | Auld et al..................... | 318/331 |
| 3,436,635 | 4/1969 | James et al................... | 318/345 X |

Primary Examiner—Oris L. Rader
Assistant Examiner—Robert J. Hickey
Attorney—Frank R. Trifari ABSTRACT: A speed control circuit for a series motor includes a periodically operable transistor switch in series with the motor field winding and armature for controlling the width of the motor energizing pulses as a function of its speed. A sampling circuit samples the armature back emf only when the transistor switch is off. The sampled pulses of armature emf are fed to an integrating circuit which in turn supplies a control signal to the base of the transistor switch to vary its on-off time as a function of the sampled back emf. A resistor is connected across the armature and the transistor switch in order to energize the series field with a fixed current during each sampling period.

SERIES MOTOR ON-OFF SPEED CONTROL CIRCUIT HAVING MEANS FOR GENERATING A COMPLEMENTARY FIELD CURRENT

The present invention relates to the measurement, the control and the regulation of the speed of an electric series motor. In domestic apparatus it is preferred to employ electric series motors. These motors have an advantage over shunt motors in that they do not require an energizing winding having a great number of turns of fairly thin wire. Owing to the latter requirement shunt motors are less rugged and more expensive. However, in some applications, the use of a series motor involves is inconvenient. This applies to those applications in which the motor is subject to a torque varying considerably in operation, for example, in drilling apparatus, washing machines, dough mixers which mix first a liquid which becomes progressively thicker to form a dough, and in many other uses. In all these cases a considerable increase in torque results in a considerable reduction of the speed of the series motor. Owing to its self-regulating action a shunt motor maintains a substantially constant speed. In order to preserve the ruggedness of the apparatus it is therefore desirable to use a series motor with a speed regulating circuit. This gives rise to the difficulty of a simple measurement of the speed. In domestic appliances the solution provided by the use of tachometer generators or photoelectric or magnetic means is neither simple nor practical. The price would be too high or the volume required would be too large.

The main object of the invention is therefore to provide a speed regulator for an electric series motor having a simple generator for producing a signal representative of said speed. In order to simplify the whole regulating circuit the other elements of the circuit are combined as far as possible with the elements employed in the measuring signal generator. Obviously this generator may also be used solely for measuring or other purposes, without being included in a regulating circuit.

The voltage across the armature of an electric commutator motor is, as is known, equal to $$E = Kn\Phi + RI,$$

wherein $K$ is a constant of the motor, $n$ is the number of revolutions per unit of time, $\Phi$ is the flux produced by the inductor, $R$ is the internal resistance of the armature, $I$ is the current through the armature.

Owing to the term $RI$ and since $\Phi$ depends upon the current and hence upon the torque of the motor, $E$ cannot represent the value of $n$. For this reason it is necessary to use a tachometer dynamo having a constant energization, whose counter e.m.f., which is representative of the speed of revolution, appears at the terminals of the armature.

In order to use the armature of the motor itself, it is necessary that $E$ be proportional to $n$. For this reason $I$ has to be equal to zero, but since this is the current producing the motor torque, it cannot be entirely cut off. According to the invention this current is interrupted for short repetitive periods only and, during these periods of interruption, a sampling pulse of the voltage across the armature is transferred to a circuit which converts the obtained pulse sequence into a fluctuating signal representing the mean value of the pulses received. However, this is not sufficient in itself to make the voltage across the armature be representative of the speed of the motor when a sample is taken. Since a series motor is concerned here, the current $I$ through the inductor is also interrupted and, also in accordance with the invention, the inductor is connected to a complementary current generator for supplying a known current thereto during the sampling periods.

Under these conditions the value of the voltage across the armature may be considered to represent the speed of the motor during each sampling operation. The mean value of the pulse sequence is therefore representative of said speed.

According to the invention the generator for producing a signal representative of the speed of revolution of the electric series-motor is characterized in that it comprises a periodically operating interruptor in the motor circuit, a circuit for generating a complementary current connected to the inductor and energizing the latter at least during the time the interruptor is off, a sampling circuit connected to the terminals of the armature and transferring each sampling pulse only during said time of interruption and an integrating circuit connected to the output of the sampling circuit and suitable for establishing a mean value of the incoming sampling pulses.

The invention will now be described with reference to the accompanying drawings in which.

Figure 1:
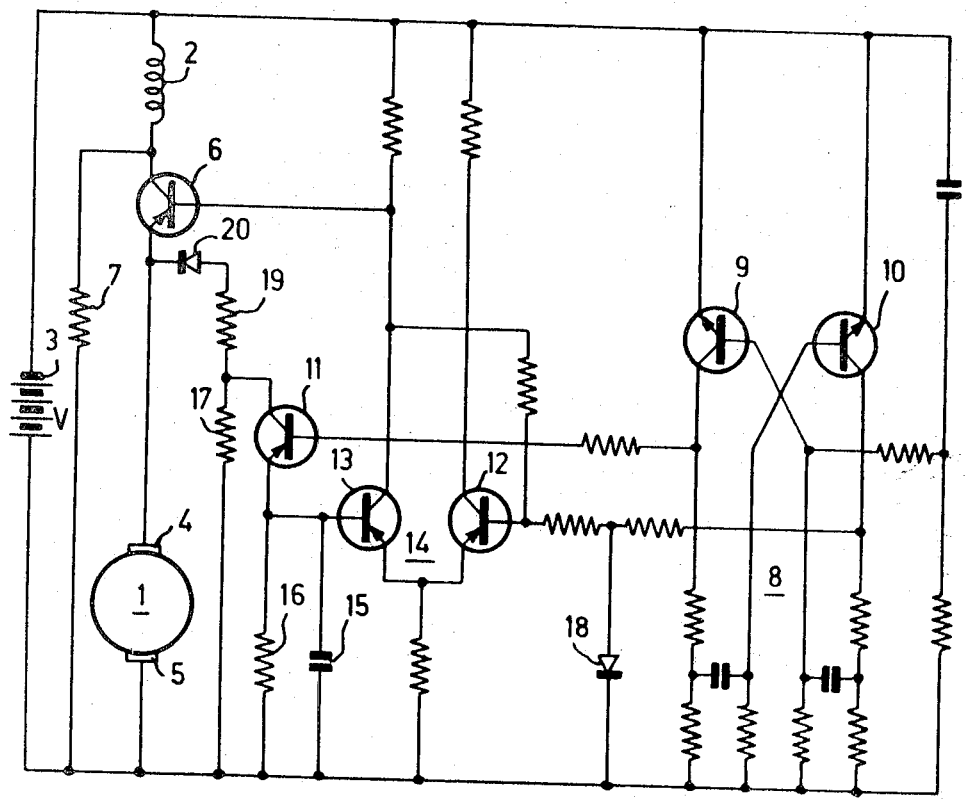
FIG. 1 shows a first embodiment of the invention comprising a speed control circuit suitable for use with a DC motor.

The first embodiment of the circuit (FIG. 1) is intended to regulate a direct-current series motor. The motor comprising an armature 1 and an inductor 2 is fed from a DC source 3. A periodically operating interruptor is formed by a transistor 6, connected between the inductor and the armature. A resistor 7 is connected between the inductor and the source. The inductor is traversed by the armature current and by a complementary current flowing through a closed loop formed by the inductor 2, the source 3 and the resistor 7. When the transistor 6 is cut off, the inductor is traversed by a known complementary current that is the same for each sampling period.

The sampling circuit is formed by a voltage divider connected to the terminals 4 and 5 of the armature and including resistors 17 and 19. A sampling transistor 11 transfers the potential at the junction of the resistors 17 and 19 in synchronism with the control-signals derived from a multivibrator 8. A pulse sequence is thus formed, which arrives at a parallel RC-circuit formed by a capacitor 15 and a resistor 16. This RC-circuit converts this pulse sequence into a fluctuating voltage representing the mean value of the pulse sequence. This voltage is applied to the base of a transistor 13, while a Zener diode 18 provides a constant voltage to the base of a transistor 12. The two transistors 12 and 13 are connected together to form a trigger circuit 14, the output of which controls the base of the interruptor 6. The multivibrator 8 comprises transistors 9 and 10.

Figure 2:
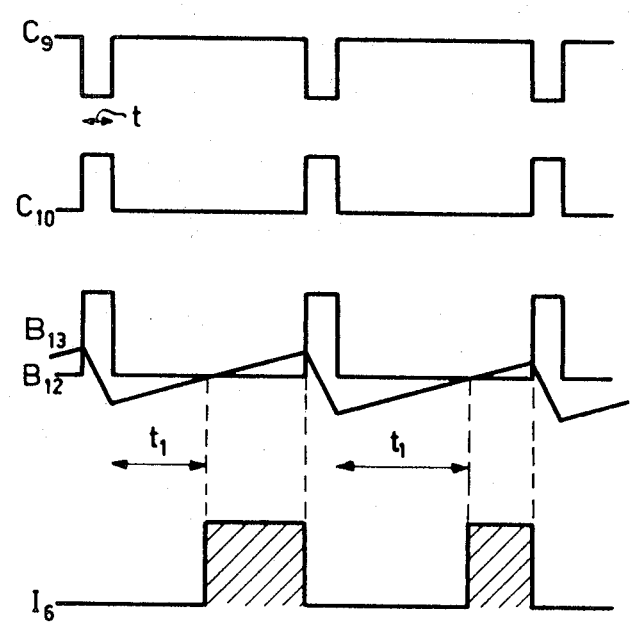
FIG. 2 shows the voltage at various points of the circuit.

The operation of said circuit will be described with reference to FIG. 2. This Figure illustrates the variations of the potential or the current as a function of time: $C_9$ and $C_{10}$ illustrate the potentials at the collectors of the transistors 9 and 10; $B_{12}$ and $B_{13}$ illustrate the potentials at the bases of the transistors 12 and 13 and $I_6$ shows the current through the transistor 6.

The transistor 9 of the multivibrator passes pulses of a duration $t$ to the sampling transistor 11. During this time, the capacitor 15 is rapidly charged: the potential $B_{13}$ drops and the trigger 14 changes its state so that the transistor 13 becomes conducting. Consequently, the potential at the base of the transistor 6 increases, so that the transistor 6 is cut off. Therefore, during the sampling time $t$, the interruptor 6 is cutoff and the inductor 2 is traversed by a known, constant current. The transition period of the current into this known current is negligibly short and becomes shorter as the time constant $L/R$ of the circuit formed by the inductor 2 and the resistor 7 is reduced. In order to prevent the trigger 14 from changing its state during sampling due to a parasitic signal, the base of the transistor 12 is connected to the collector of the transistor 10 through a resistor. A positive pulse is thus transferred to the base of the transistor 12 (see $B_{12}$ in FIG. 2). At the end of the sampling period $t$ the multivibrator 8 changes over and cuts off the switch 11, and a reference potential is applied to the base of the transistor 12. The capacitor 15 discharges through the resistor 16 and the potential $B_{13}$ (FIG. 2) increases. The trigger 14 changes its state at the instant of equality of $B_{12}$ and $B_{13}$, that is to say after a time $t_1$. At this instant the interruptor 6 closes again.

When the motor speed increases, the level of the sawtooth voltage $B_{13}$ drops: the time $t_1$ increases and the mean closing time of the interruptor 6 decreases. The motor then decelerates. A speed of equilibrium is thus established which is the nominal speed of revolution of the motor. This speed is determined by the elements of the circuit and not by the torque of the motor. It is therefore possible to vary this nominal speed by varying an element of the circuit, for instance the resistor 19. The resistor 17 is a voltage-dependent resistor (low resistance-value for high voltages) in order to avoid excessive voltages at the collector of the transistor 11.

Steps are taken to ensure that, within an oscillation period of the multivibrator, the time of conduction of the transistor 9 is appreciably shorter than that of the transistor 10 (5 to 10 times) and that this period is so related to the time constant of the RC-circuit that the potential at the base of the transistor 13 has the form of a sawtooth superimposed on a LC component of the same order of magnitude, determined by the mean value of the amplitude of the sampling pulses. Consequently, the time of nonconduction of the transistor 6, after the sampling period of the transistor 11, will be prolonged by the time $t_1$ required by the capacitor to recover to the Zener voltage.

Figure 3:
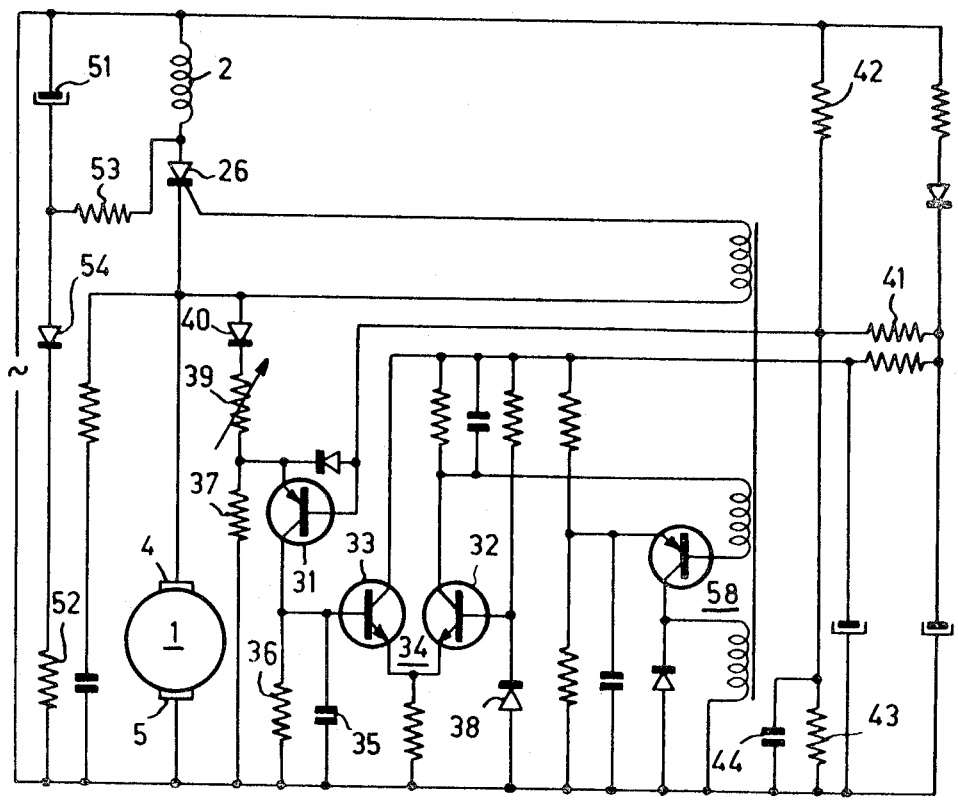
FIG. 3 shows a second embodiment suitable for use with an AC motor.

FIG. 3 shows a second embodiment of a regulating circuit using a measuring generator according to the invention. The series motor comprising an armature 1 and an inductor 2 is fed from an AC source. The interrupting element in the armature-circuit is a thyristor 26 connected between the inductor and the armature of the motor. The inductor 2 is traversed by the current passing through the armature of the motor and by a complementary current supplied by a circuit including a capacitor 51, a diode 54 and resistors 52 and 53. The sampling circuit is similar to that of the preceding embodiment and includes a voltage divider (resistors 37 and 39) and a sampling transistor 31. This sampling circuit passes a pulse sequence to an output circuit formed by a parallel RC-circuit consisting of capacitor 35 and resistor 36, the operation of which is the same as in the preceding embodiment, and which also delivers a sawtooth voltage superimposed on a DC component representative of the speed of revolution of the motor. A trigger 34, comprising transistor 32 and 33, serves for comparing this voltage with a reference voltage obtained from a Zener diode 38. The output of this trigger circuit controls a blocking-oscillator 58, the output pulses of which are applied to the control-electrode of the thyristor 26. The sampling transistor 31 is controlled by a polarizing base voltage. This voltage is the superimposition of a DC voltage supplied by a voltage divider comprising resistors 41 and 43 and of an AC voltage slightly delayed with respect to the supply voltage and supplied by a voltage divider comprising resistors 42 and 43 and a capacitor 44.

The operation of the circuit will now be described with reference to the diagrams of FIG. 4. In this Figure $B_{26}$, $B_{31}$, $B_{33}$ are the potentials at the bases of the semiconductors 26, 31, 32 and 33, respectively, and $E_{26}$, $E_{31}$, and $E_{54}$ are the potentials at the emitters of the semiconductors 26, 31 and 54, respectively.

Sampling is performed during the time T when the potential $B_{31}$ at the base of the transistor 31 is lower than the potential $E_{31}$ at its emitter. During this time the charging current of the capacitor 35 depends upon the speed of revolution of the motor. The potential $B_{33}$ at the base of the transistor 33 increases and exceeds that at the base of the transistor 32 ($B_{32}$). The trigger 34 changes over and cuts off the oscillator 58. At the termination of the sampling period T, the capacitor 35 discharges and at the instant when $B_{33}$ becomes equal to $B_{32}$, the trigger 34 changes over and releases the oscillator 58. The latter then applies ignition pulses ($B_{26}$) to the control-electrode of the thyristor 26. The thyristor becomes conducting and remains conducting during the whole further part of the positive half period $T_1$ of the supply voltage. It is not conducting during the subsequent half period $T_2$ and the phase of the voltage $B_{31}$ is adjusted so that the sampling time T lies within the period of time during which the thyristor is cut off.

The circuit supplying the complementary current to the inductor 2 operates as follows: during the positive half period $T_1$ the capacitor 51 is charged to the peak voltage through the diode 54 and a resistor 52, which serves for reducing the charging current. After the supply voltage has attained its peak value. the capacitor 51 discharges through the inductor.

The curve $E_{26}$ illustrates the potential at the emitter of the thyristor 26 and $E_{54}$ the potential at the emitter of the diode 54. The potential is relative to the upper terminal of the supply source. The complementary current is proportional to the voltage $V_{53}$ across the resistor 53. It is found that this current is substantially constant and known during the sampling time T, since the time constant of the RC-circuit 51–53 is very large with respect to the time $T_2$.

Figure 4:
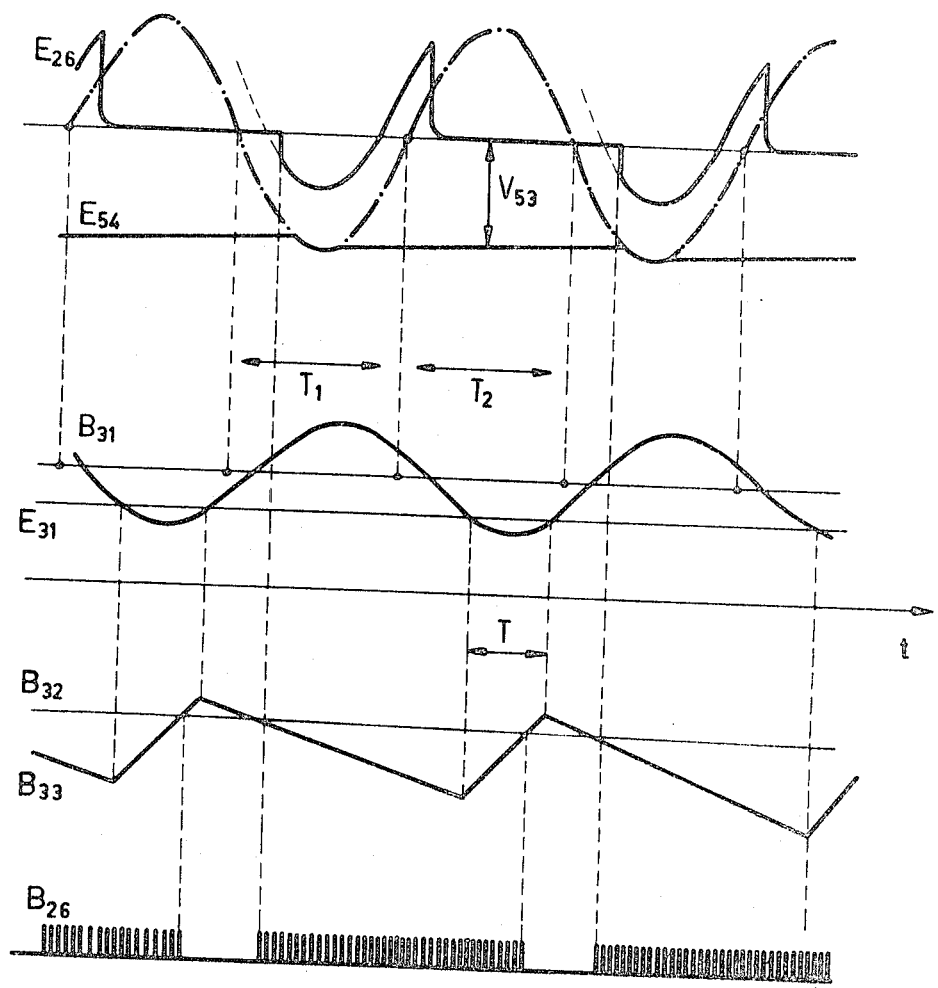
FIG. 4 illustrates the voltages produced in said second embodiment.

From FIG. 4 it will be apparent that the sawtooth $B_{33}$ rises when the speed increases. The trigger 34 then takes more time before it releases the oscillator 58 and the thyristor is ignited later. The total current decreases and the motor decelerates. The motor maintains a speed of equilibrium which is the nominal speed of revolution. A regulating circuit is thus obtained. The speed of equilibrium depends, as in the preceding embodiment, upon the elements of the circuit and not upon the torque. The speed may be modified by varying one of the elements, for example, the resistor 39. As in the preceding embodiment the resistor 37 is a voltage-dependent resistor.

It will be seen that in this embodiment the level of the sawtooth $B_{33}$ is not strictly proportional to the voltage across the armature. There is simply a correspondence between a given voltage and a given level. This is sufficient for control.

Recapitulating, the circuit arrangement according to the invention comprises mainly:
  a. An interruptor periodically interrupting the supply current of the armature.
  b. A sampling circuit for the voltage across the armature, producing by means of a sampling switch a sequence of sampling pulses. This sampling switch is closed only when the main interruptor is cut off.
  c. A circuit generating a complementary current which maintains the flux at a known value during each sampling period.
  d. An output circuit receiving the sequence of sampling pulses and deriving the mean value thereof.

In the first embodiment the interruptor (a) is a transistor 6 and in the second embodiment it is a thyristor 26.

The circuit (b) is formed in embodiment 1 by the voltage divider 17–19 the protective diode 20 and the transistor 11, which forms the sampling switch, and in the embodiment 2 by the corresponding elements, i.e., the voltage divider 37–39, the protective diode 40 and the transistor 31.

The circuit (c) is formed in the first embodiment by the resistor 7 and in the second embodiment by the capacitor 51, the resistors 52 and 53 and the diode 54.

The circuit (d) is formed in both embodiments by an RC-circuit.

It is not necessary for the circuit (c) to be a constant-current circuit. The sole condition is that during each sampling period the current and its variations should always be the same for each period. The resultant output signal will thus always be the same for the same speed of revolution. This is sufficient for said signal to be representative of the speed. For the same reason it is not necessary for the amplitude of the voltage transferred to the RC-circuit to be directly proportional to E, or for the duration of each sampling period to be constant, nor for the samples to be taken at regular intervals. It is sufficient that the transferred voltage to be representative of the voltage E, i.e., be a function thereof and for the duration of the sampling period to be dependent upon E. Also for the same reason it is not necessary for the output circuit to provide accurately the mean value of said pulses. This circuit need only form a DC component which is representative of E and hence of said mean value. If these conditions are satisfied, the output signal is representative of the speed. It is therefore not necessary for the output circuit to be an RC-circuit. It may, for example, also be a circuit storing the value of the amplitude of the last received sample or any other circuit converting a pulse sequence into a fluctuating signal. Nor is it necessary that the sampling switch be a transistor. It may be replaced by any other switch, for example, a reed relay.

The supply current interruptor may be formed by a semiconductor, for example, a transistor or a thyristor, or by a reed relay. It will be obvious that other means than those shown in FIGS. 1 and 3 may also be employed for obtaining the same flux during sampling. One might use an additional direct current source connected to the induction in parallel with the supply source or one might even use a permanent magnet. It will be apparent that the choice of the circuits and of the components for carrying out the invention depends upon the intended use. It is easier to control and to determine the sampling periods in AC operation than in DC operation, since in the latter case (FIG. 1) a multivibrator-oscillator is required. However, with a DC source, it is much easier to obtain a constant current through the inductor during the interruption of the armature circuit. In this case a resistor 7 is sufficient.

The described measuring method is not restricted to household motors. The invention may also be used with industrial motors, in which case the problem of volume is less important.

It should be noted that the invention may also be used solely for speed measurements. When it is combined with regulation, as in the embodiments described, any advantages are obtained. The first main advantage resides in the fact that the measuring circuit already comprises an interruptor interrupting the current to the armature during repetitive periods. The same interruptor may be used for prolonging the period of interruption beyond the sampling period by a lapse of time which depends upon the error ascertained by the comparing member of the regulating circuit. The switches 6 and 26 therefore have a double function: that of interruption for allowing the measurement to take place and that of a regulating element. A second advantage may be obtained by the RC-circuit. The time constant may be chosen so that the output voltage is formed by the direct measuring voltage on which a sawtooth is superimposed. In this case a comparison trigger (14 or 34) may be employed which compares said sawtooth with a fixed voltage for determining the additional time of interruption in accordance with the error ascertained by the comparing member. This idea is carried into effect in the two embodiments described.

What is claimed is:

1. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and synchronized with said switching means to sample the back e.m.f. of the motor only during said cutoff intervals of the switching means, an integrating circuit connected to the output of the sampling circuit to integrate the sampled pulses of back e.m.f. to derive a measuring signal indicative of the motor speed, a comparison member having a first input to which said measuring signal is applied, a second input to which a reference signal indicative of the nominal motor speed is applied and an output at which an error signal is produced that is indicative of the difference between the actual motor speed and the nominal motor speed, and means for regulating the on-off time of said switching means that includes means for coupling the error signal at the output of the comparison member to said switching means so as to regulate the on-off time thereof in a sense that tends to reduce the error signal.

2. A control circuit as claimed in claim 1 wherein said switching means comprises a thyristor having a control electrode to which the error signal is applied, and said complementary current deriving means comprises impedance means coupled to said field winding to supply thereto a current of the same amplitude during each sampling period and which is independent of the armature induced e.m.f.

3. A control circuit as claimed in claim 1 wherein the integrating circuit comprises a resistor and capacitor connected to form a parallel RC-circuit having a time constant that is short in relation to the cycle period of the switching means so that the integrating circuit produces a voltage comprising a sawtooth voltage superimposed on a DC component of voltage of the same order of magnitude, and said comparison member comprises a trigger circuit having first and second inputs to which are applied the output voltage of the parallel RC-circuit and a reference voltage, respectively, and an output for supplying a signal that turns on the switching means upon equality of the voltages at said first and second inputs.

4. A control circuit as claimed in claim 2 further comprising a source of DC supply current for the motor, a resistor, and wherein the means for generating the complementary current comprises the supply source and the resistor connected to form a closed loop circuit with said field winding.

5. A control circuit as claimed in claim 1 further comprising means for generating sampling pulses of a fixed duration that is shorter than one half period of the switching means cycle period, and means for coupling said sampling pulses to the sampling circuit to control the sampling of the motor back e.m.f.

6. A speed control circuit for e.m.f. series motor comprising, a source of AC supply current for the motor, periodically operable switching means comprising a semiconductor control device connected in the motor armature circuit between the field winding and the motor armature, means for deriving a complementary current and supplying same to the motor field winding during the intervals when the switching means is cut off, said current deriving means comprising a branch circuit connected to the terminals of the supply source and including, in series a capacitor, unidirectional conduction element and a first resistor, and means connecting one of the terminals of the field winding to an electrode of the capacitor and the other terminal to the other electrode of the capacitor via a second resistor, a sampling circuit connected to the terminals of the motor armature and periodically operable to sample the back e.m.f. of the motor only during said cutoff intervals of the switching means, an integrating circuit connected to the output of the sampling circuit to integrate the sampled pulses of back e.m.f., and means for coupling the output of the integrating circuit to said switching means so as to vary the conduction period thereof as a function of the induced e.m.f. in the armature during the sampling period.

7. A control circuit as claimed in claim 6 wherein the unidirectional element comprises a diode and the components of said branch circuit are chosen so that the diode is cut off during the intervals when the switching means is cut off.

8. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and periodically operable to sample the back e.m.f. of the motor only during said cutoff intervals of the switching means, said sampling circuit including a voltage divider formed by two series-connected resistors connected to the terminals of the armature, means connecting the junction of said two resistors to a first electrode of a semiconductor control element having at least three electrodes, means for supplying to a control electrode thereof a periodic bias voltage, an integrating circuit connected to a third electrode of the semiconductor control element to integrate the sampled pulses of back e.m.f., and means for coupling the output of the integrating circuit to said switching means so as to vary the conduction period thereof as a function of the induced e.m.f. in the armature during the sampling period.

9. A control circuit as claimed in claim 8 further comprising a source of AC supply current for the motor, a circuit for converting the supply voltage into a periodic DC bias voltage of the same frequency, and means connecting the output of the converting circuit to the control electrode of the semiconductor control element of the sampling circuit.

10. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and periodically operable to sample the back e.m.f. of the motor only during said cutoff intervals of the switching means, an integrating circuit connected to the output of the sampling circuit to integrate the sampled pulses of back e.m.f., said integrating circuit comprising a resistor and capacitor connected to form a parallel RC-circuit that is arranged to produce a sawtooth voltage superimposed on a DC component of voltage proportional to the mean voltage of the sampled back e.m.f. pulses, and means for coupling the output of the integrating circuit to said switching means so as to vary the conduction period thereof as a function of the induced e.m.f. in the armature during the sampling period.

11. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and periodically operable to sample the back e.m.f. of the motor only during said cutoff intervals of the switching means, said sampling circuit including a current control member having a control electrode to which said sampling pulses are applied, and means for coupling said sampling pulses to said switching means so that a sampling pulse simultaneously operates to turn the switching means off and the sampling circuit on, an integrating circuit connected to the output of the sampling circuit to integrate the sampled pulses of back e.m.f., and means for coupling the output of the integrating circuit to said switching means so as to vary the conduction period thereof as a function of the induced e.m.f. in the armature during the sampling period.

12. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and periodically operable to sample the back e.m.f. of the motor only during said cutoff intervals of the switching means, an integrating circuit connected to the output of the sampling circuit to integrate the sampled pulses of back e.m.f., and means for coupling the output of the integrating circuit to said switching means so as to vary the conduction period thereof as a function of the induced e.m.f. in the armature during the sampling period, said coupling means including a trigger circuit having a first input to which the output voltage of the integrating network is applied and a second input to which a reference voltage is applied, and said switching means comprises a semiconductor control device having a control electrode connected to the output of said trigger circuit.

13. A speed control circuit for a series motor comprising, periodically operable switching means connected in the motor armature circuit, means for deriving a complementary current and supplying same to the motor field winding during the intervals when the switching means is cut off, a sampling circuit connected to the terminals of the motor armature and periodically operable to sample the back e.m.f. of the motor only during said cutoff intervals of the switching means, an integrating circuit connected to the output of the sampling circuit to integrate the sampled pulses of back e.m.f., said integrating circuit comprising a resistor and capacitor connected to form a parallel RC-circuit having a time constant in relation to the cycle period of the switching means such that the integrating circuit produces a sawtooth output voltage, and means for coupling the output of the integrating circuit to said switching means so as to vary the conduction period thereof as a function of the induced e.m.f. in the armature during the sampling period.

\* \* \* \* \*